United States Patent
Tsuchiya et al.

(10) Patent No.: US 11,291,225 B2
(45) Date of Patent: Apr. 5, 2022

(54) COATING MATERIAL FOR FRIED FOOD

(75) Inventors: Yusuke Tsuchiya, Osaka (JP); Hisayuki Iesato, Osaka (JP); Toru Nakajima, Osaka (JP); Norikazu Uchida, Tokyo (JP)

(73) Assignee: NIPPON STARCH CHEMICAL CO., LTD., Osaka (JP)

( * ) Notice: Subject to any disclaimer, the term of this patent is extended or adjusted under 35 U.S.C. 154(b) by 866 days.

(21) Appl. No.: 14/112,730

(22) PCT Filed: Apr. 20, 2011

(86) PCT No.: PCT/JP2011/060201
§ 371 (c)(1),
(2), (4) Date: Oct. 18, 2013

(87) PCT Pub. No.: WO2012/144083
PCT Pub. Date: Oct. 26, 2012

(65) Prior Publication Data
US 2014/0037827 A1    Feb. 6, 2014

(51) Int. Cl.
*A23L 7/157*       (2016.01)
*A23P 20/12*      (2016.01)

(52) U.S. Cl.
CPC .............. *A23L 7/157* (2016.08); *A23P 20/12* (2016.08)

(58) Field of Classification Search
USPC ........................................................ 426/634
See application file for complete search history.

(56) References Cited

U.S. PATENT DOCUMENTS

| 4,140,803 A | * | 2/1979 | Panchuk et al. ................. 426/93 |
| 4,963,378 A | * | 10/1990 | Bhardwaj ..................... 426/302 |
| 2012/0258237 A1 | * | 10/2012 | Tsuchiya et al. ............. 426/661 |

FOREIGN PATENT DOCUMENTS

| JP | 61-285956 A | | 12/1986 |
| JP | 05-017823 B2 | | 3/1993 |
| JP | 08-173073 A | | 7/1996 |
| JP | 09215478 A | * | 8/1997 |
| JP | 11-243891 A | | 9/1999 |
| JP | 2003199518 A | * | 7/2003 |
| JP | 2003-325119 A | | 11/2003 |
| JP | 2004085303 A | * | 3/2004 |
| JP | 2004-113236 A | | 4/2004 |
| JP | 2005-185122 A | | 7/2005 |
| JP | 2006129788 A | * | 5/2006 |
| WO | 2011/49076 A1 | | 4/2011 |

OTHER PUBLICATIONS

English Translation for JP 2004-113236 A.*
English Translation for JP 2003-325119 A.*
Hoover et al. Effect of Cross-Linking on Functional Properties of Legume Starches. (1986), pp. 149-155.*
Translation of JP2003325119A Matsunaga.*
International Search Report dated Aug. 2, 2011, issued in corresponding application No. PCT/JP2011/060201.
Notification of Transmittal of Translation of the International Preliminary Report on Patentability (Forms PCT/IB/326) of International Application No. PCT/JP2011/060201 dated Oct. 31, 2013 with Forms PCT/IB/373, and PCT/ISA/237.

* cited by examiner

*Primary Examiner* — Stephanie A Cox
(74) *Attorney, Agent, or Firm* — Westerman, Hattori, Daniels & Adrian, LLP

(57) ABSTRACT

The present invention provides a coating material for fried or deep-fried foods maintaining crisp feel and soft feel of freshly fried or deep-fried foods even a long time after frying or deep-frying or after freezing-thawing as well as a premix comprising the coating material and such fried or deep-fried foods, more specifically, a coating material comprising an oil/fat-processed starch having a swelling degree of 2.5-8.5 ml which has been derived from a swelling-inhibited legume starch, is used for cooking fried or deep-fried foods.

7 Claims, No Drawings

COATING MATERIAL FOR FRIED FOOD

TECHNICAL FIELD

The present invention relates to a coating material for fried food and/or for deep-fried food. More specifically, the invention relates to a coating material for fried food and/or for deep-fried food which exhibits when fried in oil a satisfactory adhesiveness with main ingredients such as livestock meats, fishes and shells, vegetables or processed foods thereof, and is capable of maintaining an excellent texture well-balanced in crisp feel and soft feel even a long time after frying or deep-frying or after freezing-thawing, premix comprising the coating material and fried and/or deep-fried food using the coating material.

BACKGROUND ART

Batter premixes mainly consist of low-gluten flour to which are added proteins, starches, emulsifiers or the like for purposes of texture improvement and thickening agents such as pregelatinized starch and gums to impart viscosity as necessary to a batter liquid are used as coating materials for fried and/or deep-fried food. However, fried or deep-fried foods cooked using such conventional coating materials show crisp feel immediately after frying of deep-frying and can not maintain crisp feel a long time after frying or deep-frying or after freezing-thawing. Further, in fried or deep-fried foods using conventional coating materials, since adhesiveness of a coating material to a main ingredient (a food item) is poor, the coating material easily peels off, which lowers commercial value.

Numerous batters mainly composed of oil/fat-processed starch (otherwise referred to as oil/fat-modified starch, oil/fat-coated starch, etc.) have been proposed in order to improve adhesiveness between a food item and a coating without using any wheat flour. Examples thereof include a process employing an oil/fat-processed starch whose slurry at a concentration of 40% by weight has a viscosity of at least 200 cPs (Jpn. unexamined patent publication No. 61-285956=Patent Document 1) and a coating material for fried food containing an oil/fat-coated starch having a surface compressive stress of 20 to 80 $g/cm^2$ and a water evaporation rate of 0.12 to 0.18%/second when adjusted with water to a concentration of 40% by weight (Jpn. unexamined patent publication No. 11-243891=Patent Document 2). Other proposals aiming to allow a textural enhancement through selecting starting starches to be oil/fat-processed are illustrated by a process using oil or fat-modified starches made from a mixture of non-glutinous rice grain starch and glutinous rice grain starch or from glutinous rice grain starch, whose slurries having a concentration of 40% by weight show a viscosity of at least 200 cPs (Jpn. examined patent publication No. 5-17823=Patent Document 3) and by a process using an oil/fat-coated starch derived from a mixture of high-amylose starch and non-glutinous rice grain starch as well (Jpn. unexamined patent publication No. 8-173073=Patent Document 4).

The inventors attempting to resolve the issue of the compatibility between adhesiveness and texture invented a coating material for fried or deep-fried food using an oil/fat-processed starch treated with an oil or fat having a trienoic unsaturated fatty acids content of at least 15% by mass. In the course of the researches relating to this invention, they discovered that adhesiveness could be further improved in the presence of an oil/fat-processed starch derived from a starch treated so as to be free from swelling (Jpn. unexamined patent publication No. 2004-113236=Patent Document 5).

In addition, while not being an oil/fat-processed starch, a coating material mix for fried food mainly formulated in a characteristic manner with a legume starch or a wet heat-treated legume starch and capable to preserve the as freshly-fried desirable quality even for a prolonged period of time after frying is also disclosed in Jpn. unexamined patent publication No. 2003-325119 (=Patent Document 6).

Frying and deep frying are defined as processes of cooking and drying through contact with hot oil and involves, therefore, simultaneous heat and mass transfer. During frying and deep frying, several chemical and physical changes occur such as starch gelatinization, protein denaturation and crust formation. The chemical browning reactions taking place between reducing sugars and protein sources, the absorption of frying oil, density of the fried products as well as the temperature and frying period lead to color development during the frying process.

Fried products are judged by their functional properties. Crispness is typically a textural parameter for fried products which depends upon the ingredients, formulation (proper balance among ingredients), and processes. Moisture and oil contents are important properties in determining fried food product quality. Porosity and oil uptake was found to increase with frying time during frying.

Thus, batter products are highly attractive foods. Coatings enhance the flavor, texture, and appearance, adding value to the substrate food by giving the fried product a pleasant golden color and a crispy exterior texture that is normally very appetizing.

Changes in lifestyle, particularly in the western world, have consolidated the availability and sales of convenience foods and frozen products, providing considerable support for the expansion and globalization of coated foods. Nowadays, the market for this type of product is growing steadily, and there are even major food service sector companies with a worldwide presence that only serve products of this kind.

Automation of manufacturing, innovations in the coating methods, the demand for more sophisticated foods, diversification, and a concern to develop healthier products that contain less fat are the factors that dominate the latest research trends in this area. The research fields have been increasing permanently in recent years. They cover developments in both coating formulations and coating application technology.

In the traditional process, the manufacturer batters the food pieces (chicken pieces, chicken nuggets, and strips, beef fritters and fingers, pork chunks, veal products, etc. . . . ), prefries them for a few seconds in order to give the batter a certain solidity of consistence, and then freezes them. The consumer buys them in this form and, in turn, fries them for a few minutes in order to cook them, normally until a gold external color has been reached.

While the batter is raw, it must create a homogenous layer that covers the food, which is normally also raw, and must adhere to it before and after coagulation—which takes place during the prefrying step—and during final frying; after the batter coagulates it must withstand freezing temperature and normal handling (packaging and transportation) without cracking or breaking and without losing any portion of the external layer; during the final frying performed by the consumer's home it must create an over crust with good acceptability in terms of texture (particularly crispness), flavor, and color. Coating might also need to prevent oxidation, limit moisture and oil transfer, give freeze/thaw stability, and extend shelf life. Of course, they must also be cost-effective.

To achieve these objectives researches into the behavior of flours and starches have traveled a long way and a considerable array of ingredients with a broad range of functionalities has begun to be used.

However, such conventional coating materials can be hardly used to prepare homogeneous batters and remain disadvantageous in that batter tends to settle out with time. Moreover, problems such as a significant reduction in commercial value due to a poor adhesion between ingredient (food item) and coating, thus making coating liable to detachment, occurred when cooking with such coating materials.

The reasons for loss of texture and taste of fried foods have never been clear in the art. Some investigators have asserted that oil infusion into fried foods is responsible, while others have asserted that loss of moisture from the fried foods is responsible. Most likely, both are responsible for the loss of texture and taste.

PRIOR ART

Patent Document

[Patent Document 1] Jpn. unexamined patent publication No. 61-285956
[Patent Document 2] Jpn. unexamined patent publication No. 11-243891
[Patent Document 3] Jpn. examined patent publication No. 5-17823
[Patent Document 4] Jpn. unexamined patent publication No. 8-173073
[Patent Document 5] Jpn. unexamined patent publication No. 2004-113236
[Patent Document 6] Jpn. unexamined patent publication No. 2003-325119

SUMMARY OF THE INVENTION

Problems to be Resolved by the Invention

Although an improvement of adhesiveness can be seen as compared to previous batters mainly made of soft wheat flour, the techniques as disclosed by Patent Documents 1 and 2 are not fully satisfactory as regards textural characteristics. Thereafter, efforts were made along with techniques as disclosed by the Patent Documents 3 and 4 to improve texture by selecting the raw starch intended for oil or fat treatment. However, while requirements for adhesiveness become stronger as technologies advance, these techniques where texture deteriorates if emphasis is put on adhesiveness while insufficient adhesiveness is seen when texture is emphasized are not able to resolve the challenge of the compatibility between adhesiveness and texture on a high level basis.

Accordingly, the inventors developed the technique as disclosed by Patent Document 5 as a means to resolve aforementioned problems. In particular, they managed to create a higher compatibility between adhesiveness and texture by using a swelling-inhibited starch as a starting material for oil/fat-processed starch. In this text, a texture was evaluated mainly immediately after frying or deep-frying or at least when a long time had not passed.

Recently, a requirement to temporal stability of texture has become higher because life changes in life style enhance consumption of frozen products and convenience foods. However, the technique as disclosed by Patent Document 5 could neither prevent temporal deterioration in texture nor maintain a texture of freshly fried or deep-fried products even after freezing-thawing, satisfactorily. Moreover, this process problematically required a plurality of steps and, even if manufacturing could be performed in one step, was disadvantaged by the complexity of the operations involved.

Batter premixes containing proteins, starch, emulsifiers or the like for purposes of texture improvement are usually used for fried or deep-fried foods. However, proteins and emulsifiers added for purposes of texture improvement frequently affect a characteristic of oil/fat-modified starch which is good adhesiveness of the coating material to a main ingredient.

Furthermore, the technique as disclosed by the Patent Document 6, although imparting a satisfactory texture, did not bring the slightest improvement of adherence of coating to items to be fried.

Most of currently commercial oil/fat-processed starches use a tapioca starch or a corn starch as a raw material. Conventionally, oil/fat-processed starches derived from a corn starch were frequently used. Recently, an amount of an oil/fat-processed starch derived from a tapioca starch is increasing in replace of that derived from a corn starch because a tapioca starch results in softer texture than a corn starch does. Thus, a demand for a texture of oil/fat-processed starches is enhanced.

Patent Document 5 describes that it is preferable to swelling-inhibit a corn starch and a tapioca starch. Swelling-inhibition treatments include a chemically cross-linking, a dry-heat treatment, a wet-heat treatment (also known as heat-moisture treatment), a hot-water treatment and hypochlorite treatment. When a swelling inhibition treatment is performed on a tapioca starch, the chemically cross-linking and the dry-heat treatment are relatively easy to adjust a swelling degree. On the other hand, the wet-heat treatment, the hot-water treatment and the hypochlorite treatment can result in a desired swelling inhibition only under extremely severe conditions. Therefore, swelling inhibition treatments to be used have been limited.

In view of the aforementioned problems to be resolved, the invention is intended to propose a coating material for fried food having excellent adhesiveness and texture and capable of maintaining a texture of freshly fried or deep-fried products even a long time after frying or deep-frying or after freezing-thawing.

Means for Resolving the Problems

Through their extensive research efforts to solve such problems, the inventors have discovered that a coating material for frying or deep-frying, comprising an oil/fat-processed legume starch having a swelling degree of 2.5-8.5 ml, which has been derived from a swelling-inhibited legume starch and premix comprising the coating material have excellent adhesion and texture and capable of maintaining a texture of freshly fried or deep-fried products even a long time after frying or deep-frying or after freezing-thawing.

Further, the present inventor have discovered that when a legume starch is used as a raw material, swelling inhibition can be easily controlled even by a wet-heat treatment, a hot-water treatment and a hypochlorite treatment, which cannot easily result in a desired swelling inhibition for a tapioca starch to increase a number of choices for swelling inhibition treatments. Among them, a coating material comprising an oil/fat-processed starch derived from a swelling-inhibited legume starch having a swelling degree of 2.5-8.5 ml, which has been treated by a dry-heat treatment or a hypochlorite treatment has been found to be more excellent in adhesiveness, texture and temporal stability in texture. Accordingly, the present invention has been accomplished.

More specifically, the coating material according to the present invention comprises oil/fat-processed starch having a swelling degree of 2.5-8.5 ml, obtained by oil/fat-processing swelling-inhibited legume starch. Preferably, the coating material for frying or deep-frying according to the present invention is a coating material comprising oil/fat-processed starch derived from a swelling-inhibited legume starch having a swelling degree of 2.5-8.5 ml, which has been treated by a dry-heat treatment or a hypochlorite treatment. The present invention also provides premix for frying or deep-frying comprising the above-mentioned coating material, and fried or deep-fried food.

Effect of the Invention

A fried or deep-fried food using the premix for frying or deep-frying which comprises the coating material according to the present invention has excellent adhesion and texture and is capable of maintaining an excellent texture well-balanced in crisp feel and soft feel even a long time after frying or deep-frying or after freezing-thawing.

MODE FOR CARRYING OUT THE INVENTION

The coating material for frying or deep-frying, the premix for frying or deep-frying and the fried or deep-fried foods according to the present invention will be explained in detail but the description does not intend to limit the scope of the present invention and the present invention may be practiced by appropriately modifying the following examples without departing from the spirit of the invention.

As a swelling-inhibited starch being a material for the oil/fat-processed starch according to the present invention, a legume starch which has been swelling-inhibited to a specific extent may be used. The extent of swelling-inhibition is defined with "swelling degree" as described below. The swelling-inhibited legume starch according to the present invention preferably has a swelling degree of 2.5-8.5 ml. When the swelling degree is higher than 8.5 ml, adhesion is insufficient in the cases where a main ingredient difficult to be adhered is used and where a protein or emulsifier interfering good adhesiveness is added or crisp feel cannot be obtained a long time after frying or deep-frying. On the other hand, when the swelling degree is lower than 2.5 ml, although a freshly-fried texture is good, it is not preferable because a texture becomes hard or dull texture a long time after frying or deep-frying or after freezing-thawing.

The expression "legume" for the purposes of the present invention is understood to mean any plant belonging to the Caesalpiniaceae, Mimosaceae or Papilionaceae families and in particular any plant belonging to the Papilionaceae family, for example common pea, haricot bean, broad bean, field bean, lentil, lupin, clover, lucerne, kidney bean, mottled kidney bean, fava bean, pigeon pea, adzuki bean, cowpea, scarlet runner bean, mung bean and wrinkled pea, for instance. This definition includes in particular all the plants described in any of the tables contained in the article by R. HOOVER et al. entitled "Composition, structure, functionality and chemical modification of legume starches: a review" Canadian Journal of Physiology and Pharmacology, 1991, 69, pp 79-92.

Preferably, the legume is chosen from the group comprising pea, haricot bean, broad bean and field bean. Advantageously, it is pea, the term "pea" being considered here in its broadest sense and including in particular:
all the wild varieties of "smooth pea" and "wrinkled pea"; and
all the mutant varieties of "smooth pea" and "wrinkled pea",
regardless of the uses for which the said varieties are generally intended (human consumption, animal nutrition and/or other uses).

The said mutant varieties are in particular those called "r mutants", "rb mutants", "rug 3 mutants", "rug 4 mutants", "rug 5 mutants" and "lam mutants" as described in the article by C-L HEDLEY et al. entitled "Developing novel pea starches" Proceedings of the Symposium of the Industrial Biochemistry and Biotechnology Group of the Biochemical Society, 1996, pp. 77-87.

According to another advantageous variant, the legume is a plant, for example a pea or field bean variety which gives seeds containing at least 25%, and preferably at least 40% by weight of starch (dry/dry).

In the present invention, a starch to be a raw material for producing a swelling-inhibited starch is referred to as a "raw starch" and a starch treated by swelling-inhibition to be a raw material for producing an oil/fat-processed starch is referred to as a "swelling-inhibited starch."

The raw starch to be used in the present invention is a non-modified starch and a modified starch derived from the above legume. Modification methods for the production of modified starch include, for example, hypochlorite-treatment, acid-treatment, cross-linking, esterification, etherification, cross-linking by esterification, cross-linking by etherification. These modified starches should have a swelling degree of 2.5-8.5 ml after swelling inhibition treatment bellow.

When a chemically cross-linking is used for swelling-inhibition, a degree of modification does not matter much because a swelling degree can be varied with an amount of a cross-linking agent. However, since there is a limit to what other treatment methods can swelling-inhibit a starch, a raw starch is preferably a non-modified starch or a lightly-modified starch.

The "swelling-inhibition" in the present invention is a treatment to inhibit swelling of starch particles when heated in the presence of water and includes chemically cross-linking and other physical treatments. Chemically cross-linked starches include a phosphate cross-linked starch, an acetylated adipate cross-linked starch, an epichlorohydrin cross-linked starch. Methods for preparing them are well known to those skilled in the art and, are described, for example, in "Dempun Kagaku No Jiten (Encyclopedia for Starch Science)", edited by Eiji Fuwa et al., 2003, First Edition, Asakura Publishing Co., Ltd.

Other treatments are also known, such as a wet-heat treated starch, a dry-heat treated starch, a hot-water treated starch, a hypochlorite-treated starch.

The "wet-heat treatment" is to heat a starch in a sealed container at a water content where a starch does not gelatinize.

The "dry-heat treatment" is to adjust a pH of a starch alkali followed by decreasing a water content and then, heating under a condition where a starch does not decompose.

The "hot-water treatment" is to maintain a starch suspension at a temperature close to a gelatinization temperature without gelatinizing.

The "hypochlorite treatment" is to adjust a pH of a starch suspension to 8.0-12.0 followed by adding a small amount (usually, to a starch, 0.01-0.5% by mass as an available chlorine quantity) of sodium hypochlorite or calcium hypochlorite. Hypochlorite should be carefully added bit by bit because starches may decompose when a lot of hypochlorite is added at once. A reaction is carried out suitably for 1-10 hours. After completion of the reaction, a reducing agent such as sodium sulfite, sodium hydrogensulfate and sodium ascorbate is added to quench the residual chlorine and, then, the reactant is neutralized, washed with water, dehydrated, dried and fine-powderized.

Although any swelling inhibition treatments can be used for the present invention as far as a swelling degree of the 2.5-8.5 ml is obtained.

The upper limit of a suitable range for a swelling degree is 8.5 ml for any swelling inhibition treatment. When the swelling degree is above 8.5 ml, crispness diminishes and softness is apt to deteriorate after microwave cooking. On the other hand, the lower limit of a suitable range may vary depending from swelling inhibition treatment methods.

For cross-linked starches and wet-heat treated starches, the lower limit is preferably 2.5 ml or above. Since these two treatments are able to prepare a strongly swelling inhibited starch (a starch having a lower swelling degree) easily, starches having a swelling degree of 2.5 ml or below can be prepared. However, when the swelling degree is below 2.5 ml, texture becomes too hard and adhesiveness reduces.

For dry-heat treated starches, hot-water treated starches and hypochlorite treated starches, the lower limit of a suitable range for a swelling degree is 4.0 ml. When these three treatments are used to prepare a strongly swelling inhibited starch (a starch having a lower swelling degree), a risk of decomposition and gelatinization of starches is enhanced. Oil/fat-processed starches derived from decomposed or gelatinized starches do not show good adhesiveness and texture.

The "swelling degree" in the present invention is an indication to indicate a degree of swelling inhibition of a starch and it is determined as following procedures.

150 mg (dry solid weight conversion) of a sample is accurately weighed and transferred to a test tube. To this is added a test solution described below correctly at 15 ml, mixed them well by shaking and then, immediately it is placed into a boiling-water bath for heating. After heating for 5 minutes, it is rapidly cooled to room temperature, then shaken again to homogenize. To a 10-ml measuring cylinder, 10 ml of the solution in the test tube is transferred and it is allow standing at 20° C. for 18 hours. An amount of precipitate (ml) is measured to be a swelling degree.

A process for preparing a test solution: After solving zinc chloride 300 g and ammonium chloride 780 g in ion exchanged water 1875 g by heating, the solution is cooled and its Baume degree is adjusted to 19 (15° C.). 10 ml of this solution is removed and two drops of a bromophenol blue solution are added. Titration with 0.1 N HCl is performed to determine a hydrochloric acid degree (a factor of HCl×ml of the amount used in the titration) from an end point of titration at which a color of the solution changes from violet to yellow. The hydrochloric acid degree is adjusted to 3.9+/−0.1 by using aqueous ammonium and hydrochloric acid. After adjustment, the hydrochloric acid degree is determined again and, then, the solution is filtered for use as a test solution.

The oil/fat-processed starch is a starch in which physical properties on a surface of a starch particle is altered by attaching oil/fat on at least a part of the surface. This may be obtained by mixing a starch with oil/fat and heat-aging it at temperatures above a room temperature. By this, a starch having a property different from those of a mere mixture of a starch and oil/fat is obtained.

Heat-aging is to treat a starch and oil/fat at temperatures above a room temperature in a mixture state. The treatment proceeds at temperatures above a room temperature and a time required to heat-aging becomes shorter at higher temperatures. However, at excessively high temperatures, hydrolysis or pyrolysis of a raw starch occurs, resulting in deterioration of adhesion when it is used for a coating material for frying or deep-frying. Accordingly, for heat-aging, conditions should be determined where excessive decomposition does not occur. An appropriate heating temperature is 30 to 150° C. When the heating temperature is lower than 30° C., it is not practical because a very long time is required for heat-aging and when the heating temperature is higher than 150° C., it is not preferable because possibility of decomposition of a raw starch is high. The time for heat-aging becomes shorter at higher temperatures but it is appropriately in a range from 1 to 336 hours (two weeks).

As heat-aging proceeds, a slurry viscosity increases due to alteration in surface properties of a starch. Therefore, heat-aging is terminated when an increase in a slurry viscosity is observed. Generally, a viscosity of an aqueous slurry containing 40% by mass of a well heat-aged oil/fat-processed starch is not especially limited to but generally 200 to 1500 mPa·s (measured on B-type viscometer, at room temperature and at 60 rpm).

An effect of heat-aging on a swelling degree of a swelling inhibited starch is explained below. Heat-aging is usually carried out at 30 to 150° C. As the heating temperature becomes higher, the difference between the swelling degrees before and after heat aging becomes greater. Heat-aging at a lower temperature does not cause a great difference. It is supposed that a status of starch particles is altered by heat.

Oil/fat-process of the swelling-inhibited legume starch having a swelling degree of 2.5-8.5 ml in the present invention may affect the swelling degree. Swelling degrees of a corn starch and a tapioca starch increase or change little after oil/fat processing. Swelling degrees of the legume starch according to the present invention decrease or change little after oil/fat processing.

As discussed above, inadequate conditions for heat-aging cause excessive decomposition of starches, leading to vanishing of a swelling inhibition effect, where a swelling degree of an oil/fat-processed starch becomes almost 10 ml (the maximum value in swelling degree measurement is 10 ml.) Since such an oil/fat-processed starch shows decreased adhesiveness, heat-aging is preferably carried out under conditions where starches do not excessively decompose to make a swelling degree of the oil/fat-processed starch within a range of 2.5-8.5 ml.

No particular limitation is imposed on the edible oil and fat employed in the production of oil/fat-processed starch according to the invention. Examples of such oils and fats include vegetable oils and fats such as soybean oil, cotton seed oil, corn oil, rapeseed oil, safflower oil, olive oil, sesame oil, rice oil, coconut oil, flaxseed oil, perilla oil and perilla seed oil as well as animal oils and fats such as sardine oil, herring oil and cod liver oil.

All methods for adding oils and fats are acceptable as long as such substances can be uniformly dispersed and mixed with the raw powder, in particular by mixing in a mixer the raw starch previously added with oil or fat.

Furthermore, as disclosed in Patent Document 5, a better adhesiveness is achieved by employing an edible oil or fat having a content of trienoic unsaturated fatty acids of at least 15% by mass. Fish oils such as sardine oil and herring oil, but also vegetable oils such as perilla oil, perilla seed oil, borage oil, evening primrose oil, hempseed oil, flaxseed oil and kiwifruit oil are examples of oils and fats containing 15 mass % or more of trienoic unsaturated fatty acids. Given that linolenic acid is representative of such trienoic unsaturated fatty acids, perilla oil, perilla seed oil, borage oil, evening primrose oil, hempseed oil, flaxseed oil and kiwifruit oil whose linolenic acid content is equal to or higher than 15% by mass thus may be used as oils suitable for the invention. The fatty acid composition of the edible oils and fats can be determined after hydrolysis by analytical means such as gas chromatography.

The preferred amount of these oils and fats added to the raw starch ranges between 0.01 and 1.0% by mass, more preferably from 0.05 to 0.5% by mass. No sufficient adhesiveness between ingredient to be fried and coating would be demonstrated if said amount is inferior to 0.01% by mass, whereas excessive addition of oil or fat over 1.0% by mass would result in an increased risk of caking for oil/fat-processed starch.

The oil/fat-processed starch of the invention can be used as a coating material for fried food to prepare fried items, tempura, deep-fried breaded pork, deep-fried breaded beef, fried minced cutlets, fried chicken cutlets, cream croquettes, fritters, sea food beignets and the like as well as dusting flour, dredging powder and batter. Depending on which kind of food ingredient is used, when needed, the oil/fat-processed flour of the invention may be used in combination with materials commonly used as coatings for fried food items.

Concrete examples of such materials include cereal flours (wheat four, corn flour, rice flour, pregelatinized cereal flours, etc.), non-modified starches (cornstarch, wheat starch, rice starch, etc.), modified starches (oil/fat-processed starches other than those of the invention, hypochlorite-oxidized starches, acid-treated starches, pregelatinized starch, dry heat-treated starches, wet heat-treated starches, cross-linked starches, esterified starches, etherified starches, esterified cross-linked starches, etherified cross-linked starches, etc.), saccharides (monosaccharides, disaccharides, oligosaccharides, starch hydrolysates, reduced starch hydrolysates, etc.), natural gums (guar gum, xanthan gum, tamarind seed gum, carrageenan, etc.), swelling agents (baking powder, sodium bicarbonate, etc.), proteins (soybean proteins, milk proteins, egg albumen, egg yolk, casein, etc.), oils and fats (soybean oil, margarine, etc.), emulsifiers (lecithin, glycerol fatty esters, sugar esters, etc.), pigments (β-carotene, Enchi yellow, etc.) and seasonings (mirin, shoyu, salt, sodium glutamate, nucleic acid based flavoring agents, etc.).

Below is described in more detail the invention by way of examples which do not restrict the scope thereof. Henceforth, [% by mass] and [parts by mass] are indicated by [%] and [parts] respectively.

EXAMPLES

<Phosphate Cross-Linked Starch>

A slurry prepared by adding under stirring 1000 parts of a starch to a solution of 30 parts of sodium chloride and 10 parts of sodium hydroxide in 1300 parts of water was reacted at 30° C. for 1 to 24 hours after having been added with 0.1 part of sodium trimetaphosphate (STMP) to achieve respective predetermined swelling degrees. Subsequently, phosphate cross-linked starches were derived through neutralization, water washing, dehydration, drying and fine-powdering processes. Raw starches and swelling degrees for the derived phosphate cross-linked starches are shown in Table 1.

TABLE 1

| Sample No. | Raw starch | Swelling degree [ml] |
|---|---|---|
| C1 | Pea Starch | 9.1 |
| C2 | | 8.5 |
| C3 | | 7.3 |
| C4 | | 5.7 |
| C5 | | 3.1 |
| C6 | | 2.5 |
| C7 | | 1.8 |
| C8 | | 1.5 |
| C9 | | 1.2 |
| C10 | Mung Bean Starch | 5.5 |
| C11 | Lentil Starch | 5.3 |
| C12 | Acetylated Pea Starch * | 5.6 |
| C13 | Corn Starch | 9.2 |
| C14 | | 7.1 |
| C15 | | 5.9 |
| C16 | | 3.3 |
| C17 | | 1.9 |
| C18 | Tapioca Starch | 9.3 |
| C19 | | 7.5 |
| C20 | | 5.4 |
| C21 | | 3.2 |
| C22 | | 1.7 |

* Acetyl group content = 0.5 % by mass

<Swelling Degree Measurement>

The water content of the swelling-inhibited starch C1 was measure on a moisture tester (Infrared Moisture Balance FD-600, manifactureed by Kett Electric Laboratory) at a drying temperature of 105° C. and a drying time of 20 minutes to be 12.0% by mass. This mixtured sample was accurately weighted to be 170.5 mg so that 150 mg of dry mass of starch is obtained (170.5 mg=150 mg/88%) and this was transferred to a test tube. Into this, a test solution prepared according to the above process for preparing a test solution was added accurately 15 ml with a whole pipette. Immediately after shaking well the tube to form a uniform dispersion, the tube was placed in a boiling water bath to heat it. If a sample was difficult to disperse, a vibrator "Touch Mixer MT-11", manufactured by Yamanto Scientific Co., Ltd. was used to disperse. After 5 minutes heating, the tube was cooled in a water bath at 10° C. or lower. When its temperature was lowered to room temperature, it was shaken again to disperse. 10 ml of this solution was transferred to a 10-ml measuring cylinder and allowed to stand at 20° C. for 18 hours. The value at a boundary between an aqueous phase and a starch gelatine solution phase was read. Swelling measurements were conducted for all samples according to the above procedures.

<Oil/Fat-Processed Starch Derived from Phosphate Cross-Linked Starch>

Oil/fat-processed starch samples 1-27 were obtained by adding 0.1 parts of each edible oil or fat to the respective raw starches shown in Table 1 and heating it in a tray dryer at 130° C. for 2-6 hours. The raw starches and the edible oils or fats used and the swelling degrees are shown in Table 2.

TABLE 2

| Oil/fat-processed Starch Sample | | Swelling-inhibited Starch sample | Edible Oil/Fat | Swelling degree of Oil/fat-processed Starch [ml] |
|---|---|---|---|---|
| Example | 1 | C2 | Perilla oil | 8.4 |
| | 2 | C3 | Perilla oil | 6.2 |
| | 3 | C4 | Perilla oil | 4.9 |
| | 4 | C5 | Perilla oil | 3.1 |
| | 5 | C6 | Perilla oil | 2.5 |
| | 6 | C10 | Perilla oil | 4.9 |
| | 7 | C11 | Perilla oil | 4.6 |
| | 8 | C12 | Perilla oil | 5.0 |
| | 9 | C4 | Perilla seed oil | 4.8 |
| | 10 | C4 | Flaxseed oil | 5.0 |
| | 11 | C4 | Safflower oil | 5.0 |
| | 12 | C4 | Corn oil | 5.4 |
| | 13 | C4 | Soybean oil | 5.2 |
| Comparative Example | 14 | C1 | Perilla oil | 8.9 |
| | 15 | C7 | Perilla oil | 1.8 |
| | 16 | C8 | Perilla oil | 1.5 |
| | 17 | C9 | Perilla oil | 1.2 |
| | 18 | C13 | Perilla oil | 9.7 |
| | 19 | C14 | Perilla oil | 7.7 |
| | 20 | C15 | Perilla oil | 6.2 |
| | 21 | C16 | Perilla oil | 3.6 |
| | 22 | C17 | Perilla oil | 2.0 |
| | 23 | C18 | Perilla oil | 9.8 |
| | 24 | C19 | Perilla oil | 8.1 |
| | 25 | C20 | Perilla oil | 6.0 |
| | 26 | C21 | Perilla oil | 3.8 |
| | 27 | C22 | Perilla oil | 1.8 |

Experiment 1

Batter liquids were prepared by adding 200 parts of water to premix which has been obtained by sufficiently mixing 100 parts of oil/fat-processed starches of Sample Nos. 1 to 27, 0.5 to 1.0 part of guar gum as a viscosity corrector (adjusted to get a batter viscosity from about 2500 to 3500 mPa·s (B-type viscometer, rotor no. 3, 12 rpm, 15° C.)) and 0.5 parts of dried egg white (SunKirara SHG; produced by Taiyo Kagaku Co., Ltd.) as a texture improving agent. Deep-fried breaded ham cutlets were made by evenly applying those batter liquids on frozen ham slices, rolling them into bread crumbs and, after overnight freezing, frying 3 pieces of each for 3 minutes in cooking oil heated at 175° C. Adhesiveness and texture of resulting ham cutlets were evaluated according to the following assessment criteria.

<Adhesiveness of Coating to Food Ingredient>

Immediately after frying, adhesiveness on cut surface of the 5 ham cutlets was evaluated on a zero-to-ten scale (if a sample has an intermediate evaluation, for example, between 10 and 8, the sample scores 9). Results were obtained on the basis of average values.

| Score | Evaluation |
|---|---|
| 10 | tenaciously adherent |
| 8 | relatively tenaciously adherent, despite slight separations |
| 6 | relatively favorably adherent, despite some separations |
| 4 | rather highly visible separations, poor adhesiveness as a whole |
| 2 | numerous separations on cut surface of which more than half with no adherence |

<Texture Immediately after Frying>

Five assessors were asked to score texture of ham cutlets within 5 minutes after frying upon tasting on a zero-to-ten scale (if a sample has an intermediate evaluation, for example, between 10 and 8, the sample scores 9). Results were obtained on the basis of average values.

| Score | Evaluation |
|---|---|
| 10 | extremely favorable texture with a good balance between crisp feel and soft feel |
| 8 | favorable texture with relatively proper crisp feel and soft feel |
| 6 | rather insufficient crisp feel or soft feel, with some tackiness felt |
| 4 | rather hard or rather sticky, somewhat poor texture |
| 2 | too hard or too sticky, poor texture |

<Texture after Microwave Cooking>

Five assessors were asked to score texture of ham cutlets after roughly cooling fried ham cutlets, freezing in a refrigerator for 15 days, thawing and microwave cooking them upon tasting on a zero-to-ten scale (if a sample has an intermediate evaluation, for example, between 10 and 8, the sample scores 9). Results were obtained on the basis of average values.

| Score | Evaluation |
|---|---|
| 10 | extremely favorable texture of a good soft feel with maintaining sufficient crisp feel |
| 8 | favorable texture of a soft feel with maintaining relatively proper crisp feel and soft feel |
| 6 | rather insufficient texture of a poor crisp feel with insufficient crisp feel |
| 4 | rather hard or rather sticky, somewhat poor texture |
| 2 | poor texture of a hard feel with no crisp feel |

A global assessment was made on the basis of the total scores provided by adhesiveness and texture ratings.

<Global Assessment>

| AA | total scores | 26.0-30.0 |
|---|---|---|
| A | total scores | 22.0-25.9 |
| B | total scores | 18.0-21.9 |
| C | total scores | 14.0-17.9 |
| D | total scores | 10.0-13.9 |
| E | total scores | 0.0-9.9 |

Results of Experiment 1 are summarized in Tables 3 and 4.

TABLE 3

| Oil/fat-processed Starch Sample No. | Swelling-inhibited Starch Sample | Adhesiveness | Texture immediately after frying | Texture after microwave cooking | Global Assessment |
|---|---|---|---|---|---|
| Example 1 | C2 | 7.6 | 8.6 | 7.0 | A/23.2 |
| 2 | C3 | 8.2 | 8.2 | 7.6 | A/24.0 |
| 3 | C4 | 9.4 | 8.4 | 8.0 | A/25.8 |
| 4 | C5 | 8.0 | 8.0 | 8.4 | A/24.4 |
| 5 | C6 | 7.4 | 7.4 | 7.2 | A/22.0 |
| 6 | C10 | 9.2 | 8.0 | 8.0 | A/25.2 |
| 7 | C11 | 9.2 | 8.2 | 7.8 | A/25.2 |
| 8 | C12 | 9.0 | 8.4 | 8.2 | A/25.6 |
| 9 | C4 | 9.4 | 8.2 | 8.0 | A/25.6 |
| 10 | C4 | 8.6 | 8.2 | 8.4 | A/25.2 |
| 11 | C4 | 7.6 | 8.2 | 8.6 | A/24.4 |
| 12 | C4 | 6.4 | 8.0 | 8.0 | A/22.4 |
| 13 | C4 | 7.0 | 8.2 | 8.2 | A/23.4 |

TABLE 4

| Oil/fat-processed Starch Sample No. | Swelling-inhibited Starch Sample | Adhesiveness | Texture immediately after frying | Texture after microwave cooking | Global Assessment |
|---|---|---|---|---|---|
| Comparative Example 14 | C1 | 7.0 | 7.0 | 5.6 | B/19.6 |
| 15 | C7 | 6.0 | 5.6 | 5.8 | C/17.4 |
| 16 | C8 | 3.8 | 5.4 | 5.2 | C/14.4 |
| 17 | C9 | 3.6 | 5.2 | 5.0 | D/13.8 |
| 18 | C13 | 4.8 | 6.2 | 4.6 | C/15.6 |
| 19 | C14 | 6.0 | 7.2 | 6.0 | B/19.2 |
| 20 | C15 | 7.8 | 6.4 | 5.6 | B/19.8 |
| 21 | C16 | 8.2 | 4.8 | 5.4 | B/18.4 |
| 22 | C17 | 8.4 | 5.0 | 4.4 | C/17.8 |
| 23 | C18 | 3.4 | 4.2 | 5.4 | D/13.0 |
| 24 | C19 | 6.4 | 7.6 | 5.6 | B/19.6 |
| 25 | C20 | 8.4 | 7.4 | 4.8 | B/20.6 |
| 26 | C21 | 9.0 | 7.4 | 4.4 | B/20.8 |
| 27 | C22 | 9.2 | 7.2 | 4.0 | B/20.4 |

Oil/fat-processed starches of Sample Nos. 1-13 (Examples) derived from the phosphate cross-linked legume starches were superior to oil/fat-processed starches of Sample Nos. 14-27 (Comparative Examples) in adhesiveness and texture. Even when the same phosphate cross-linked legume starch was used, samples having a swelling degree of 9.1 ml for the swelling-inhibited starches and samples having a swelling degree of 1.8 ml or lower showed inferior results in adhesiveness and texture. Oil/fat processed starches without using a legume starch as a raw material were inferior to the samples according to Examples in both or either of adhesiveness and texture regardless of swelling degrees resulting in poor in global assessment.

<Sodium Hypochlorite-Treated Starch>

Five slurries prepared by adding under stirring 1000 parts of a starch to 1300 parts of water were reacted at 30° C. for 3 hours after having been added respectively with 18, 15, 12, and 5 parts of sodium hypochlorite having an available chlorine quantity of 12% with maintaining pH at 11.5. Subsequently, a sodium sulfite solution was added to quench the residual chlorine and, then, sodium hypochlorite-treated starches were derived through neutralization, water washing, dehydration, drying and fine-powdering processes. Raw starches and swelling degrees for the derived sodium hypochlorite-treated starches are shown in Table 5.

<Calcium Hypochlorite-Treated Starch>

A slurry prepared by adding under stirring 1000 parts of a starch to 1300 parts of water was reacted at 30° C. for 3 hours after having been added with 2 parts of sodium hypochlorite having an available chlorine quantity of 75% with maintaining pH at 11.5. Subsequently, a calcium sulfite solution was added to quench the residual chlorine and, then, calcium hypochlorite-treated starches were derived through neutralization, water washing, dehydration, drying and fine-powdering processes. Raw starches and swelling degrees for the derived calcium hypochlorite-treated starches are shown in Table 5.

TABLE 5

| Sample No. | Raw Starch | Reaction reagent | Amount added [% vs. starch] | Swelling degree [ml] |
|---|---|---|---|---|
| H1 | Pea Starch | Sodium hypochlorite | 0.5 | 9.2 |
| H2 | | | 1.0 | 8.5 |
| H3 | | | 1.2 | 7.0 |
| H4 | | | 1.5 | 5.2 |
| H5 | | | 1.8 | 4.1 |
| H6 | | Calcium hypochlorite | 0.2 | 5.3 |
| H7 | Corn Starch | Sodium hypochlorite | 0.5 | 9.3 |
| H8 | | | 1.0 | 8.4 |
| H9 | | | 1.2 | 7.2 |

TABLE 5-continued

| Sample No. | Raw Starch | Reaction reagent | Amount added [% vs. starch] | Swelling degree [ml] |
|---|---|---|---|---|
| H10 | | | 1.5 | 5.1 |
| H11 | Waxy Corn | | 0.5 | 9.1 |
| H12 | Starch | | 1.0 | 8.3 |
| H13 | | | 1.2 | 7.4 |
| H14 | | | 1.5 | 6.2 |
| H15 | Tapioca | | 1.2 | 10.0 |
| H16 | Starch | | 1.5 | 9.9 |

<Oil/Fat-Processed Starch Derived from Hypochlorite-Treated Starch>

Oil/fat-processed starch of Sample Nos. 28-43 were obtained by adding 0.1 parts of each edible oil or fat to the respective raw starches shown in Table 5 and heating it in a tray dryer at 130° C. for 2-6 hours. The raw starches and the edible oils or fats used are shown in Table 6.

TABLE 6

| | Oil/fat-processed Starch Sample | Swelling-inhibited Starch | Edible Oil/Fat | Swelling degree of Oil/fat-processed Starch [ml] |
|---|---|---|---|---|
| Example | 28 | H2 | Perilla oil | 8.0 |
| | 29 | H3 | Perilla oil | 6.0 |
| | 30 | H4 | Perilla oil | 4.6 |
| | 21 | H5 | Perilla oil | 3.9 |
| | 32 | H6 | Perilla oil | 4.7 |
| Comparative | 33 | H1 | Perilla oil | 9.0 |
| Example | 34 | H7 | Perilla oil | 9.7 |
| | 35 | H8 | Perilla oil | 9.0 |

TABLE 6-continued

| Oil/fat-processed Starch Sample | Swelling-inhibited Starch | Edible Oil/Fat | Swelling degree of Oil/fat-processed Starch [ml] |
|---|---|---|---|
| 36 | H9 | Perilla oil | 7.6 |
| 37 | H10 | Perilla oil | 5.5 |
| 38 | H11 | Perilla oil | 9.7 |
| 39 | H12 | Perilla oil | 8.9 |
| 40 | H13 | Perilla oil | 7.9 |
| 41 | H14 | Perilla oil | 6.4 |
| 42 | H15 | Perilla oil | 10.0 |
| 43 | H16 | Perilla oil | 10.0 |

Experiment 2

Batter liquids were prepared by adding 200 parts of water to premix which has been obtained by sufficiently mixing 100 parts of oil/fat-processed starches of Sample Nos. 28 to 43, 0.5 to 1.0 part of guar gum as a viscosity corrector (adjusted to get a batter viscosity from about 2500 to 3500 mPa·s (B-type viscometer, rotor no. 3, 12 rpm, 15° C.)) and 0.5 parts of dried egg white (SunKirara SHG; produced by Taiyo Kagaku Co., Ltd.) as a texture improving agent. Deep-fried breaded ham cutlets were made by evenly applying those batter liquids on frozen ham slices, rolling them into bread crumbs and, after overnight freezing, frying 3 pieces of each for 3 minutes in cooking oil heated at 175° C. Adhesiveness and texture of resulting ham cutlets were evaluated according to the assessment criteria in Experiment 1.

Results of Experiment 2 are summarized in Tables 7 and 8.

TABLE 7

| | Oil/fat-processed Starch Sample No. | Swelling-inhibited Starch Sample | Adhesiveness | Texture immediately after frying | Texture after microwave cooking | Global Assessment |
|---|---|---|---|---|---|---|
| Example | 28 | H2 | 8.0 | 8.2 | 7.6 | A/23.8 |
| | 29 | H3 | 9.2 | 8.4 | 8.4 | AA/26.0 |
| | 30 | H4 | 9.6 | 8.8 | 8.2 | AA/26.6 |
| | 31 | H5 | 9.6 | 8.6 | 8.2 | AA/26.4 |
| | 32 | H6 | 9.4 | 8.8 | 8.6 | AA/26.8 |

TABLE 8

| | Oil/fat-processed Starch Sample No. | Swelling-inhibited Starch Sample | Adhesiveness | Texture immediately after frying | Texture after microwave cooking | Global Assessment |
|---|---|---|---|---|---|---|
| Comparative | 33 | H1 | 4.6 | 7.0 | 7.2 | B/18.8 |
| Example | 34 | H7 | 4.0 | 6.8 | 4.6 | C/15.4 |
| | 35 | H8 | 5.6 | 6.2 | 4.4 | C/16.2 |
| | 36 | H9 | 7.4 | 5.6 | 3.6 | C/16.6 |
| | 37 | H10 | 8.8 | 4.8 | 3.4 | C/17.0 |
| | 38 | H11 | 3.6 | 4.4 | 3.4 | D/11.4 |
| | 39 | H12 | 5.2 | 5.0 | 3.6 | D/13.8 |
| | 40 | H13 | 6.2 | 6.4 | 4.0 | C/16.6 |
| | 41 | H14 | 7.0 | 6.6 | 4.6 | B/18.2 |
| | 42 | H15 | 4.0 | 5.6 | 5.0 | C/14.6 |
| | 43 | H16 | 4.2 | 5.8 | 5.4 | C/15.4 |

Oil/fat-processed starches of Sample Nos. 28-32 (Examples) derived from the hypochlorite treated legume starches were superior to oil/fat-processed starches of Sample Nos. 33-43 (Comparative Examples) in adhesiveness and texture. Especially, samples having a swelling degree of 5.2 ml, 5.5 ml or 7.0 ml marked a highest rank AA evaluation. Even when the same hypochlorite-treated legume starch was used, samples having a swelling degree of 9.2 ml for the swelling-inhibited starches showed inferior results in adhesiveness and texture. Oil/fat processed starches without using a legume starch as a raw material were inferior to the samples according to Examples in both or either of adhesiveness and texture regardless of swelling degrees resulting in poor in global assessment.

<Dry-Heat Treated Starch>

0.2% aqueous sodium hydroxide was added to 1000 parts of a starch and kneaded it well and, then, it was predried in a tray dryer at 50° C. so as to allow its water content to be 1%. The amount of the aqueous sodium hydroxide was such that the pH of a suspension of 5 parts of the dried mixture and 95 parts of water was 8.5. This mixture was heated in a tray dryer at 160° C. for 3-6 hours to achieve respective predetermined swelling degrees. Subsequently, dry-heat treated starches were derived through neutralization, water washing, dehydration, drying and fine-powdering processes. Raw starches and swelling degrees for the derived dry-heat treated starches are shown in Table 9.

TABLE 9

| Sample No. | Raw starch | Swelling degree [ml] |
|---|---|---|
| D1 | Pea Starch | 7.3 |
| D2 |  | 4.8 |
| D3 | Acetylated Pea Starch * | 5.2 |
| D4 | Corn Starch | 7.5 |
| D5 |  | 5.0 |
| D6 | Tapioca Starch | 7.4 |
| D7 |  | 5.2 |

* Acetyl group content = 0.5 % by mass

<Oil/Fat-Processed Starch Derived from Dry-Heat Treated Starch>

Oil/fat-processed starch samples 44-50 were obtained by adding 0.1 parts of each edible oil or fat to the respective raw starches shown in Table 9 and heating it in a tray dryer at 130° C. for 2-6 hours. The raw starches and the edible oils or fats used are shown in Table 10.

TABLE 10

| | Oil/fat-processed Starch Sample | Swelling-inhibited Starch | Edible Oil/Fat | Swelling degree of Oil/fat-processed Starch [ml] |
|---|---|---|---|---|
| Example | 44 | D1 | Perilla oil | 6.6 |
|  | 45 | D2 | Perilla oil | 4.6 |
|  | 46 | D3 | Perilla oil | 5.1 |
| Comparative | 47 | D4 | Perilla oil | 7.8 |
| Example | 48 | D5 | Perilla oil | 5.5 |
|  | 49 | D6 | Perilla oil | 7.9 |
|  | 50 | D7 | Perilla oil | 5.6 |

Experiment 3

Batter liquids were prepared by adding 200 parts of water to premix which has been obtained by sufficiently mixing 100 parts of oil/fat-processed starches of Sample Nos. 43 to 50 Nos. 44 to 50, 0.5 to 1.0 part of guar gum as a viscosity corrector (adjusted to get a batter viscosity from about 2500 to 3500 mPa·s (B-type viscometer, rotor no. 3, 12 rpm, 15° C.)) and 0.5 parts of dried egg white (SunKirara SHG; produced by Taiyo Kagaku Co., Ltd.) as a texture improving agent. Deep-fried breaded ham cutlets were made by evenly applying those batter liquids on frozen ham slices, rolling them into bread crumbs and, after overnight freezing, frying 3 pieces of each for 3 minutes in cooking oil heated at 175° C. Adhesiveness and texture of resulting ham cutlets were evaluated according to the assessment criteria in Experiment 1.

Results of Experiment 3 are summarized in Tables 11 and 12.

TABLE 11

| | Oil/fat-processed Starch Sample No. | Swelling-inhibited Starch Sample | Adhesiveness | Texture immediately after frying | Texture after microwave cooking | Global Assessment |
|---|---|---|---|---|---|---|
| Example | 44 | D1 | 9.2 | 8.4 | 8.4 | AA/26.0 |
|  | 45 | D2 | 9.6 | 8.4 | 8.8 | AA/26.8 |
|  | 46 | D3 | 9.4 | 8.6 | 8.6 | AA/26.6 |

TABLE 12

| | Oil/fat-processed Starch Sample No. | Swelling-inhibited Starch Sample | Adhesiveness | Texture immediately after frying | Texture after microwave cooking | Global Assessment |
|---|---|---|---|---|---|---|
| Comparative | 47 | D4 | 8.8 | 6.4 | 5.0 | B/20.2 |
| Example | 48 | D5 | 9.0 | 6.6 | 5.6 | B/21.2 |
|  | 49 | D6 | 8.8 | 6.4 | 4.8 | B/20.0 |
|  | 50 | D7 | 9.0 | 6.6 | 5.0 | B/20.6 |

Oil/fat-processed starches of Sample Nos. 44-46 (Examples) derived from the dry-heat treated legume starches were superior to oil/fat-processed starches of Sample Nos. 47-50 (Comparative Examples) in adhesiveness and texture. Oil/fat processed starches without using a legume starch as a raw material were inferior to the samples according to Examples in both or either of adhesiveness and texture regardless of swelling degrees resulting in poor in global assessment.

<Wet-Heat Treated Starch>

240 parts of water was added to 1000 parts of a starch and kneaded it well. This mixture (the water content 29.1%) was placed in a sealed container and, then, it was heated it in a tray dryer at 80° C. for 0.5-6 hours to achieve respective predetermined swelling degrees. Subsequently, wet-heat treated starches were derived through drying and fine-powdering the heated mixture. Samples M5 and M8 were respectively obtained through water-adding, mixing, heating at 80° C. for 8 hours to samples M4 and M7 after water-washing, dehydrating, drying and fine-powdering. Raw starches and swelling degrees for the derived wet-heated starches are shown in Table 13.

TABLE 13

| Sample No. | Raw starch | Heating time [hour] | Swelling degree [ml] |
|---|---|---|---|
| M1 | Pea Starch | 1.0 | 9.4 |
| M2 | | 1.5 | 7.2 |
| M3 | | 2.0 | 4.2 |
| M4 | | 3.0 | 3.3 |
| M5 | | 6.0 + 8.0 | 2.6 |
| M6 | Corn Starch | 2.0 | 10.0 |
| M7 | | 6.0 | 9.5 |
| M8 | | 6.0 + 8.0 | 6.9 |
| M9 | High-amylose Corn Starch | 1.0 | 7.0 |
| M10 | | 1.5 | 4.0 |
| M11 | | 2.0 | 2.4 |
| M12 | Tapioca Starch | 6.0 | 9.6 |

<Oil/Fat-Processed Starch Derived from Wet-Heat Treated Starch>

Oil/fat-processed starch samples 51-62 were obtained by adding 0.1 parts of each edible oil or fat to the respective raw starches shown in Table 13 and heating it in a tray dryer at 130° C. for 2-6 hours. The raw starches and the edible oils or fats used are shown in Table 14.

TABLE 14

| | Oil/fat-processed Starch Sample | Swelling-inhibited Starch | Edible Oil/Fat | Swelling degree of Oil/fat-processed Starch [ml] |
|---|---|---|---|---|
| Example | 51 | M2 | Perilla oil | 7.2 |
| | 52 | M3 | Perilla oil | 4.2 |
| | 53 | M4 | Perilla oil | 3.2 |
| | 54 | M5 | Perilla oil | 2.5 |
| Comparative Example | 55 | M1 | Perilla oil | 9.4 |
| | 56 | M6 | Perilla oil | 10.0 |
| | 57 | M7 | Perilla oil | 9.8 |
| | 58 | M8 | Perilla oil | 7.6 |
| | 59 | M9 | Perilla oil | 6.9 |
| | 60 | M10 | Perilla oil | 4.0 |
| | 61 | M11 | Perilla oil | 2.4 |
| | 62 | M12 | Perilla oil | 9.9 |

Experiment 4

Batter liquids were prepared by adding 200 parts of water to premix which has been obtained by sufficiently mixing 100 parts of oil/fat-processed starches of Sample Nos. 51 to 62, 0.5 to 1.0 part of guar gum as a viscosity corrector (adjusted to get a batter viscosity from about 2500 to 3500 mPa·s (B-type viscometer, rotor no. 3, 12 rpm, 15° C.)) and 0.5 parts of dried egg white (SunKirara SHG; produced by Taiyo Kagaku Co., Ltd.) as a texture improving agent. Deep-fried breaded ham cutlets were made by evenly applying those batter liquids on frozen ham slices, rolling them into bread crumbs and, after overnight freezing, frying 3 pieces of each for 3 minutes in cooking oil heated at 175° C. Adhesiveness and texture of resulting ham cutlets were evaluated according to the assessment criteria in Experiment 1.

Results of Experiment 4 are summarized in Tables 15 and 16.

TABLE 15

| | Oil/fat-processed Starch Sample No. | Swelling-inhibited Starch Sample | Adhesiveness | Texture immediately after frying | Texture after microwave cooking | Global Assessment |
|---|---|---|---|---|---|---|
| Example | 51 | M2 | 7.6 | 8.6 | 8.0 | A/24.2 |
| | 52 | M3 | 7.6 | 8.6 | 8.4 | A/24.6 |
| | 53 | M4 | 7.8 | 8.4 | 8.4 | A/24.6 |
| | 54 | M5 | 7.4 | 8.4 | 8.2 | A/24.0 |

TABLE 16

| | Oil/fat-processed Starch Sample No. | Swelling-inhibited Starch Sample | Adhesiveness | Texture immediately after frying | Texture after microwave cooking | Global Assessment |
|---|---|---|---|---|---|---|
| Comparative Example | 55 | M1 | 4.8 | 7.4 | 7.6 | B/19.8 |
| | 56 | M6 | 4.2 | 6.8 | 5.2 | C/16.2 |
| | 57 | M7 | 4.6 | 7.0 | 5.4 | C/17.0 |
| | 58 | M8 | 6.2 | 7.6 | 6.4 | B/20.2 |
| | 59 | M9 | 3.8 | 7.4 | 3.6 | C/14.8 |
| | 60 | M10 | 3.2 | 6.6 | 4.2 | C/14.0 |
| | 61 | M11 | 2.8 | 7.8 | 4.8 | C/15.4 |
| | 62 | M12 | 4.2 | 4.2 | 5.8 | C/14.2 |

Oil/fat-processed starches of Sample Nos. 51-54 (Examples) derived from the wet-heated treated legume starches were superior to oil/fat-processed starches of Sample Nos. 55-62 (Comparative Examples) in adhesiveness and texture. Even when the same wet-heated treated legume starch was used, samples having a swelling degree of 9.4 ml for the swelling-inhibited starches and samples having a swelling degree of 1.8 ml or lower showed inferior results in adhesiveness and texture. Oil/fat processed starches without using a legume starch as a raw material were inferior to the samples according to Examples in both or either of adhesiveness and texture regardless of swelling degrees resulting in poor in global assessment.

<Hot-Water Treated Starch>

A slurry prepared by adding 1000 parts of a starch to 1300 parts of water was maintained at 50° C. for 24-28 hours under stirring. Hot-water treated starches were derived through neutralization, water washing, dehydration, drying and fine-powdering of this slurry. Hot-water treatment was carried out by repeating these procedures for several cycles. Raw starches and swelling degrees for the derived hot-water treated starches are shown in Table 17.

TABLE 17

| Sample No. | Raw starch | No. of Hot-Water Cycle | Swelling degree [ml] |
|---|---|---|---|
| W1 | Pea Starch | 1 | 8.5 |
| W2 |  | 2 | 7.0 |
| W3 |  | 4 | 5.5 |
| W4 |  | 9 | 4.2 |
| W5 | Corn Starch | 3 | 10.0 |
| W6 |  | 5 | 9.6 |
| W7 | Tapioca Starch | 3 | 10.0 |
| W8 |  | 5 | 9.8 |

<Oil/Fat-Processed Starch Derived from Hot-Water Treated Starch>

Oil/fat-processed starch samples 53-56 were obtained by adding 0.1 parts of each edible oil or fat to the respective raw starches shown in Table 17 and heating it in a tray dryer at 130° C. for 2-6 hours. The raw starches and the edible oils or fats used are shown in Table 18.

TABLE 18

|  | Oil/fat-processed Starch Sample | Swelling-inhibited Starch | Edible Oil/Fat | Swelling degree of Oil/fat-processed Starch [ml] |
|---|---|---|---|---|
| Example | 63 | W1 | Perilla oil | 8.5 |
|  | 64 | W2 | Perilla oil | 7.1 |
|  | 65 | W3 | Perilla oil | 5.5 |
|  | 66 | W4 | Perilla oil | 4.2 |
| Comparative Example | 67 | W5 | Perilla oil | 10.0 |
|  | 68 | W6 | Perilla oil | 9.9 |
|  | 69 | W7 | Perilla oil | 10.0 |
|  | 70 | W8 | Perilla oil | 10.0 |

Experiment 5

Batter liquids were prepared by adding 200 parts of water to premix which has been obtained by sufficiently mixing 100 parts of oil/fat-processed starches of Sample Nos. 63 to 70, 0.5 to 1.0 part of guar gum as a viscosity corrector (adjusted to get a batter viscosity from about 2500 to 3500 mPa·s (B-type viscometer, rotor no. 3, 12 rpm, 15° C.)) and 0.5 parts of dried egg white "SunKirara SHG", manufactured by Taiyo Kagaku Co., Ltd. as a texture improving agent. Deep-fried breaded ham cutlets were made by evenly applying those batter liquids on frozen ham slices, rolling them into bread crumbs and, after overnight freezing, frying 3 pieces of each for 3 minutes in cooking oil heated at 175° C. Adhesiveness and texture of resulting ham cutlets were evaluated according to the assessment criteria in Experiment 1.

Results of Experiment 5 are summarized in Tables 19 and 20.

TABLE 19

|  | Oil/fat-processed Starch Sample No. | Swelling-inhibited Starch Sample | Adhesiveness | Texture immediately after frying | Texture after microwave cooking | Global Assessment |
|---|---|---|---|---|---|---|
| Example | 63 | W1 | 6.4 | 8.4 | 7.4 | A/22.2 |
|  | 64 | W2 | 7.2 | 8.4 | 8.2 | A/23.8 |
|  | 65 | W3 | 7.2 | 8.6 | 8.4 | A/24.2 |
|  | 66 | W4 | 7.0 | 8.4 | 8.6 | A/24.0 |

TABLE 20

|  | Oil/fat-processed Starch Sample No. | Swelling-inhibited Starch Sample | Adhesiveness | Texture immediately after frying | Texture after microwave cooking | Global Assessment |
|---|---|---|---|---|---|---|
| Comparative Example | 67 | W5 | 4.0 | 6.2 | 4.6 | C/14.8 |
|  | 68 | W6 | 4.8 | 6.6 | 5.4 | C/16.8 |
|  | 69 | W7 | 3.6 | 3.6 | 5.4 | D/12.6 |
|  | 70 | W8 | 4.4 | 4.2 | 5.8 | C/14.4 |

Oil/fat-processed starches of Sample Nos. 63-66 (Examples) derived from the hot-water treated legume starches were superior to oil/fat-processed starches of Sample Nos. 67-70 (Comparative Examples) in adhesiveness and texture. It was difficult to achieve a small value of swelling degrees for oil/fat processed starches without using a legume starch as a raw material. Oil/fat-processed starches derived from them were inferior to the samples according to Examples in both or either of adhesiveness and texture regardless of swelling degrees resulting in poor in global assessment.

Experiment 6

Batter liquids were prepared by adding 200 parts of water to premix which has been obtained by sufficiently mixing a predetermined amount of oil/fat-processed starch of Sample No. 30, 1.0% of guar gum as a viscosity corrector (a batter viscosity was from about 2500 to 3500 mPa·s (B-type viscometer, rotor no. 3, 12 rpm, 15° C.)) and 1.0, 3.0 or 5.0% of a soy bean protein powder "FUJIPRO E", manufactured by Fuji Oil Co., Ltd. as a texture improving agent. Deep-fried breaded pork cutlets were made by evenly applying those batters on frozen pork loins, rolling them into bread crumbs and, after overnight freezing, frying 5 pieces of each for 5 minutes in cooking oil heated at 180° C. Adhesiveness and texture of resulting pork cutlets were evaluated according to the assessment criteria in Experiment 1.

Results of Experiment 6 are summarized in Table 21.

TABLE 21

| | Sample 30, added [%] | Soy Been Protein, added [%] | Adhesiveness | Texture immediately after frying | after microwave cooking | Global Assessment |
|---|---|---|---|---|---|---|
| Example | 98 | 1.0 | 9.4 | 8.2 | 7.8 | A/25.4 |
| | 96 | 3.0 | 9.2 | 8.6 | 8.2 | AA/26.0 |
| | 94 | 5.0 | 8.8 | 8.6 | 8.2 | A/25.6 |

The premix according to the present invention resulted in good adhesiveness and texture when used for producing pork cutlets and the texture was maintained after freezing and microwave cooking.

Experiment 7

A dusting premix was prepared by mixing the oil/fat-processed starch of Sample No. 30 and a soy protein powder "FUJIPRO E", manufactured by Fuji Oil Co., Ltd. at a predetermined ratio listed in Table 23. Prawn tempuras were made by evenly applying this dusting premix on prawns, applying a batter liquid prepared by adding 150 parts of water to 100 parts of a batter premix of a formulation listed in Table 22 and, frying 5 pieces of each for 4 minutes in cooking oil heated at 170° C. Adhesiveness and texture of resulting prawn tempuras were evaluated according to the assessment criteria in Experiment 1.

Results of Experiment 7 are summarized in Table 23.

TABLE 22

| Batter premix formulation | |
|---|---|
| Raw material | Ratio |
| Low-gluten Flour | 73.8 |
| Oxidized Starch "Starch TK", manufactured by Nippon Starch Chemical Co., Ltd. | 25 |
| Baking Powder | 1 |
| Guar gum | 0.2 |

TABLE 23

| | Sample 30, added [%] | Soy Protein, added [%] | Adhesiveness | Texture immediately after frying | after microwave cooking | Global Assessment |
|---|---|---|---|---|---|---|
| Example | 85 | 15 | 8.0 | 8.8 | 7.8 | A/24.6 |

The dusting premix according to the present invention resulted in good adhesiveness and texture when used for producing prawn tempuras and the texture was maintained after freezing and microwave cooking.

Experiment 8

Batter liquids were prepared by adding 200 parts of water to premix which has been obtained by sufficiently mixing 96% of each of mixtures containing oil/fat-processed starch of Sample No. 30 and oil/fat-processed starch derived from a phosphate cross-linked tapioca starch of Sample No. 27 at varying ratios, 1.0% of guar gum as a viscosity corrector (a batter viscosity was from about 2500 to 3500 mPa·s (B-type viscometer, rotor no. 3, 12 rpm, 15° C.)), 1.0% of a soy bean protein powder "FUJIPRO E", manufactured by Fuji Oil Co., Ltd. as a texture improving agent, 0.5% of baking powder as a swelling agent, 1.5% of salt as a seasoning. Deep-fried breaded pork cutlets were made by evenly applying those batters on frozen pork loins, rolling them into bread crumbs and, after overnight freezing, frying 5 pieces of each for 5 minutes in cooking oil heated at 180° C. Adhesiveness and texture of resulting pork cutlets were evaluated according to the assessment criteria in Experiment 1.

Results of Experiment 8 are summarized in Table 24.

TABLE 24

| | Sample 30, added [%] | Sample 27, added [%] | Adhesiveness | Texture immediately after frying | Texture after microwave cooking | Global Assessment |
|---|---|---|---|---|---|---|
| Example | 20 | 76 | 9.6 | 8.0 | 5.4 | A/23.0 |
| | 30 | 66 | 9.6 | 8.2 | 5.6 | A/23.4 |
| | 50 | 46 | 9.4 | 8.4 | 6.6 | A/24.4 |
| | 70 | 26 | 9.4 | 8.4 | 8.0 | A/25.8 |
| | 96 | 0 | 9.4 | 8.6 | 8.4 | AA/26.4 |
| Comparative | 10 | 86 | 9.6 | 7.2 | 4.6 | B/21.4 |
| Example | 0 | 96 | 9.4 | 7.0 | 4.2 | B/20.6 |

The premix comprising 20% or more of the oil/fat-processed starch according to the present invention scored good but 10% or less did not show a sufficient effect.

INDUSTRIAL APPLICABILITY

The spread of frozen products and convenience foods causes a requirement to suppress temporal change in texture of fried or deep-fried foods. The present invention provides fried or deep-fried foods maintaining crisp feel and soft feel of freshly fried or deep-fried foods even a long time after frying or deep-frying or after freezing-thawing.

The invention claimed is:

1. A coating material for fried or deep-fried food, wherein the coating material comprises an oil/fat-processed swelling-inhibited legume starch having a swelling degree of 2.5-8.5 ml,
wherein, in the oil/fat-processed swelling-inhibited legume starch, an oil/fat is attached to at least a part of a surface of a particle of a raw swelling-inhibited legume starch, and the oil/fat is present in an amount of 0.01% and 1.0% by mass relative to the raw swelling-inhibited legume starch, wherein the raw swelling-inhibited legume starch is a legume starch treated by swelling-inhibition to be a raw material for producing the oil/fat-processed swelling-inhibited legume starch.

2. The coating material for fried or deep-fried food according to claim 1, characterized in that the raw swelling-inhibited legume starch is produced by dry-heat treatment or hypochlorite treatment.

3. A premix for frying which comprises 20% by mass or more of the coating material for fried or deep-fried food according to claim 2.

4. A premix for frying which comprises 20% by mass or more of the coating material for fried or deep-fried food according to claim 1.

5. A fried or deep-fried food using the premix for frying according to claim 4.

6. The coating material for fried or deep-fried food according to claim 1, wherein the oil/fat-processed swelling-inhibited legume starch is produced by a heat-aging treatment.

7. The coating material for fried or deep-fried food according to claim 1, wherein the oil/fat-processed swelling-inhibited legume starch has been derived from a raw swelling-inhibited legume starch having a swelling degree of 2.5-8.5 ml,
wherein the swelling degree of the oil/fat-processed swelling-inhibited legume starch is the same as or less than the swelling degree of the swelling-inhibited legume starch.

* * * * *